United States Patent [19]

Bebber et al.

[11] Patent Number: 4,818,836
[45] Date of Patent: Apr. 4, 1989

[54] POWER SUPPLY FOR A THREE-PHASE PLASMA HEATING UNIT

[75] Inventors: Hans J. Bebber, Müheim; Heinrich-Otto Rossner, Essen; Bernhard Espendiller, Dülmen, all of Fed. Rep. of Germany

[73] Assignee: Fried. Krupp Gesellschaft mit beschränkter Haftung, Essen, Fed. Rep. of Germany

[21] Appl. No.: 100,768

[22] Filed: Sep. 23, 1987

[30] Foreign Application Priority Data

Sep. 24, 1986 [DE] Fed. Rep. of Germany ....... 3632425

[51] Int. Cl.$^4$ ............................................... B23K 9/00
[52] U.S. Cl. ........................... 219/121.54; 219/121.36; 219/130.1; 323/355
[58] Field of Search ................... 219/121 PT, 121 PU, 219/121 PV, 121 P, 130.1; 307/13; 323/207, 215, 332, 340, 355, 361, 363

[56] References Cited

U.S. PATENT DOCUMENTS 3,555,234  1/1971  Lepp et al. ............... 219/121 PT
3,917,992  11/1975 Volkov et al. ............ 219/121 PT

FOREIGN PATENT DOCUMENTS 2501076   6/1975 Fed. Rep. of Germany .
2943324A  1/1981 Fed. Rep. of Germany .
100606    2/1973 German Democratic Rep. .
0863223   9/1981 U.S.S.R. ........................ 219/121 PT

OTHER PUBLICATIONS

Karl-Heinz Eichler, "Stromversorgung für Drehstrom-Plasmabrenner," May 1985 (2 pages, 114 and 117).
"Stromrichteranlagen der Starkstrom-technik"; Springer-Verlag.

Primary Examiner—M. H. Paschall
Attorney, Agent, or Firm—Spencer & Frank

[57] ABSTRACT

A power supply for a three-phase plasma heating unit includes a three-phase transformer having a primary winding group with taps which are switched under load. The transformer also has secondary winding groups which are offset by a 60° phase angle, the secondary winding groups being connected to the three-phase plasma heating unit. Converter units are also connected to the secondary winding groups. Each converter unit includes a three-phase thyristor bridge and a choke connected to the bridge. Another embodiment employs two three-phase transformers. The first transformer has a secondary winding group with taps which are switched under load. The second transformer has a primary winding group which is connected to the secondary winding group of the first transformer. The second transformer also has secondary winding groups which are offset by a 60° phase angle, the secondary winding groups being connected to the three-phase plasma heating unit. Converter units, each including a three-phase thyristor bridge and a choke, are connected to the secondary winding groups.

14 Claims, 3 Drawing Sheets

POWER SUPPLY FOR A THREE-PHASE PLASMA HEATING UNIT

BACKGROUND OF THE INVENTION

The present invention relates to a power supply for a three-phase plasma heating unit of the type which includes a three-phase current transformer and converter units connected to the secondaries, with three-phase current bridges equipped with chokes or reactors being provided in a direct current circuit. A three-phase plasma heating unit will be understood to mean a set of three plasma torches connected in a three-phase current manner.

A regulatable power supply must be used to provide regulated current to a plasma torch. If alternating current is supplied, periods without current must not occur during current reversal since this would cause the plasma arc to break off. To prevent cooling of the plasma arc during current reversal and thus permit optimum refiring, the prior art employs an auxiliary arc between two electrodes disposed in the plasma torch, however, such an arc requires its own direct current supply.

German Offenlegungsschrift No.(unexamined, published application) 2,501,076 discloses a device in which the superposed arcs of a plasma heater, i.e. the auxiliary arc and the main or power arc, are powered by but a single alternating current source which also furnishes the direct current for the auxiliary arc. The direct current for the auxiliary arc is obtained by way of a rectifier arrangement from part of the secondary winding of a transformer connected to the alternating current source. This prior art circuit, however, does not have the current limitation of the main arc necessary with respect to reliable plasma torch operation. Moreover, if current is obtained from a single transformer winding, reliable and economical work with a favorable power factor is possible only within an extremely limited operating range.

To create uninterrupted current and voltage curves in poly-phase alternating current regulating systems equipped with direct current chokes, German Pat. No. 2,943,324 provides for the superposition of currents and voltages on the secondary part of a transformer and thus on the load so as to produce a current flow and voltage duration of 180°.

According to an article entitled "Stromversorgung für Drehstrom-Plasmabrenner" [Power Distribution for Three-Phase Plasma Torches] by Karl-Heinz Eichler, in the German periodical "Konstruktion—Elemente—Methoden (KEM)" [Construction—Elements—Methods], May, 1985, D-7022 Leinfelden (FRG), pages 114, 117, a converter connected to a tap on the secondary of a transformer is used for short arcs having a low requirement for voltage and a high requirement for current. The converter is initially driven until the maximum voltage of this tap is reached. As the voltage requirement of the plasma heater increases, a second converter is actuated. This second converter is connected, in parallel on the direct current side of a follower circuit, to a transformer tap having a higher voltage and lower current. Within each halfwave, the converter at the higher tap takes the place of the converter at the lower tap for the conduction of current until finally, at maximum actuation, the converter at the higher tap is the only one carrying current. If the voltage requirement increases even more, a third converter is actuated, etc. The converters are controlled by thyristors. However, this circuit has the great drawback that it requires a separate converter unit for each secondary winding, which, in addition to a large number of semiconductors, also requires a considerable control means.

Finally, East German Pat. No. 100,606 discloses a current source employing a three-phase current transformer in which the arc path (cathode to a workpiece serving as the anode) of a plasma heater operated with direct current is connected, via a non-controllable rectifier in three-phase bridge arrangement to a secondary power winding of the transformer. The arc current is regulated in steps by switching the windings of the transformer.

SUMMARY OF THE INVENTION

It is an object of the present invention to provide a power supply of the above-mentioned type which overcomes the above-mentioned drawbacks and ensures reliable current supply for the plasma heating unit without interruptions and with the least possible amount of material and control devices, without it being necessary for a direct current auxiliary arc to burn constantly.

This can be attained, according to the invention, by employing a transformer which has at least two secondary winding groups that are offset by 60° phase angle and which additionally has taps that are switched under load, with each secondary winding group being connected to a respective three-phase current bridge and with the three-phase plasma heating unit being connected to the secondary winding groups. Due to the use of tap switching, taps at the secondary windings can be omitted. The device according to the invention is therefore able to manage with only a single converter unit for each group of secondary windings. Actuation of the tap switch makes it possible to realize, in a simple manner, operation with a high power factor in all voltage ranges without having to relinquish the positive characteristics, such as current limitation, current regulation, and a steep zero crossing of the current. Furthermore a permanently operating direct current auxiliary arc is not necessary.

It is known to supply electric arcs by means of a transformer which includes a tap switch. This makes it possible to set different voltages corresponding to the length of the arc so that the effective power, the cos φ, is as great as possible. In contrast to the graphite electrodes employed in electric arc furnaces, three-phase plasma heaters generally cannot be operated solely with such a tap switching transformer since the resulting weak current phase is relatively long and it is not possible to actively limit the current.

The present invention solves this problem. The invention resides in a combination of a basically known current supplying device for three-phase current plasma heating units having at least two secondary winding groups which are offset with respect to one another by a 60° phase angle and converter units disposed on the secondary side to limit the current, as well as a transformer provided with a tap switch.

According to another advantageous feature of the invention, the tap switch is provided on the primary side or in an intermediate circuit.

DESCRIPTION OF THE PREFERRED EMBODIMENTS

Figure 1:
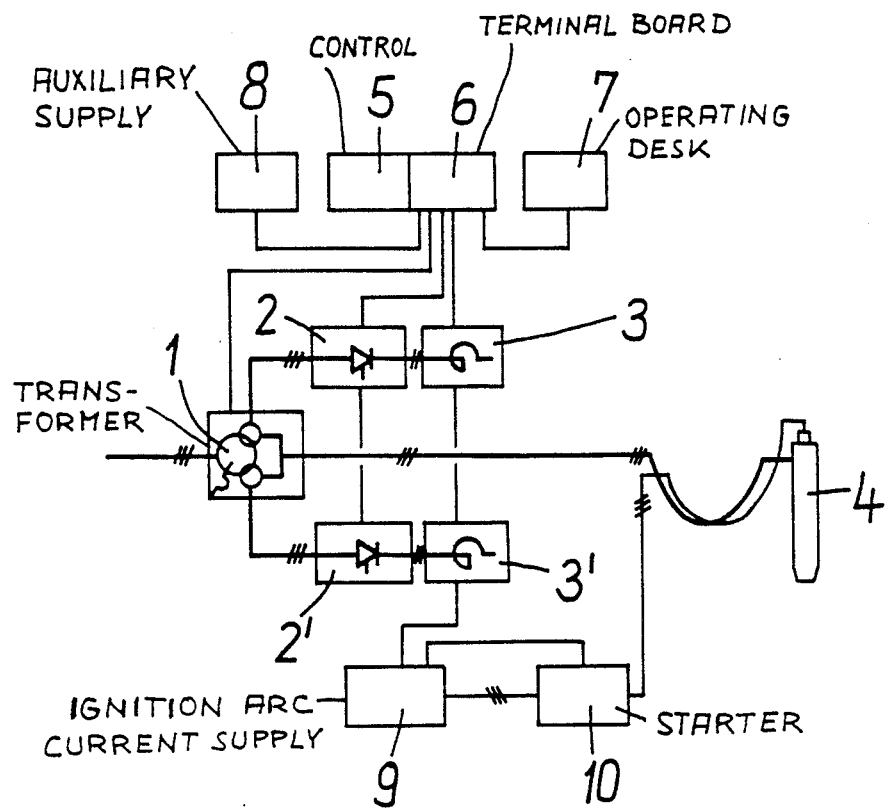
FIG. 1 is a simplified one-line diagram of a circuit arrangement which employs a power supply, having a tap switch at the primary side of a transformer, for a three-phase plasma heating unit in accordance with the present invention.
Figure 2:
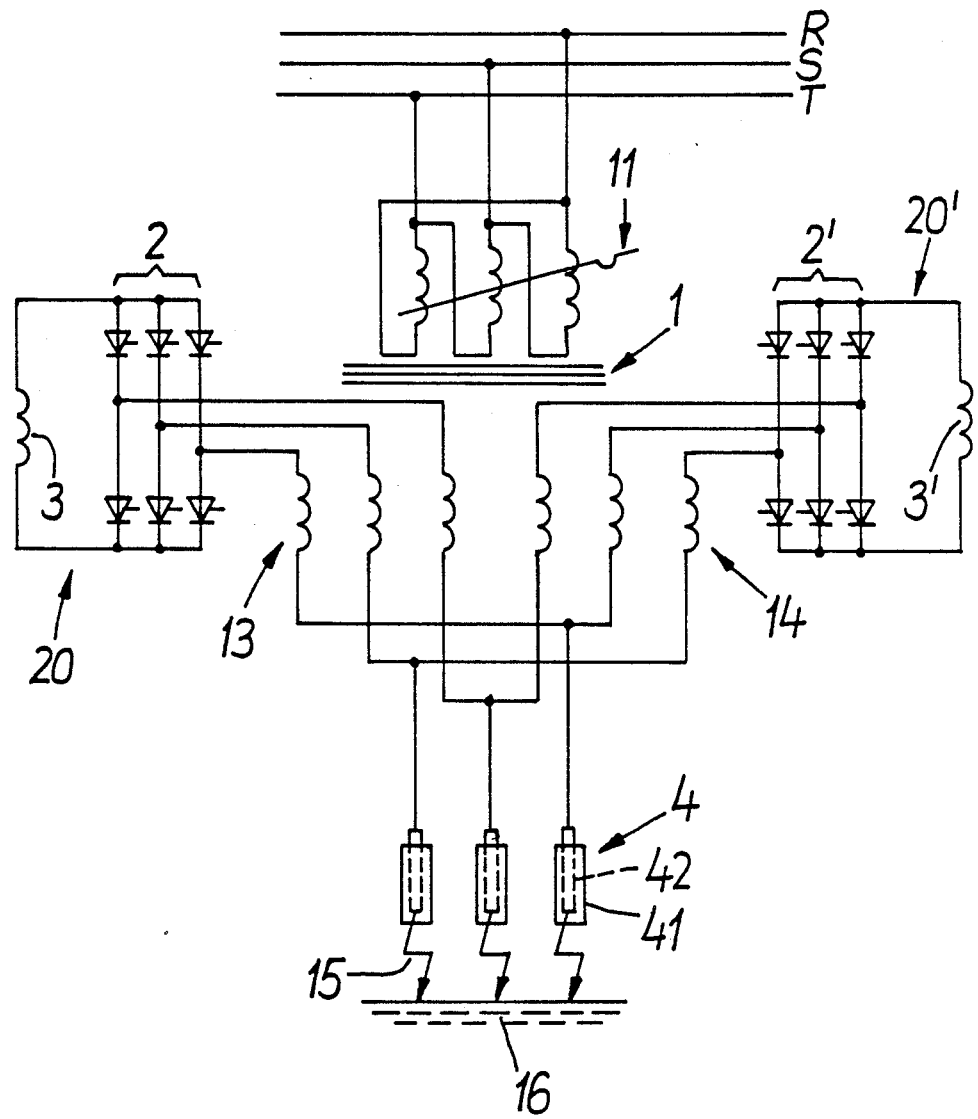
FIG. 2 is a three-phase illustration showing the power supply employed in FIG. 1 in more detail.

FIG. 1 is a simplified diagram schematically illustrating electrical equipment at a metal smeltry which employs a power supply in accordance with the present invention, together with auxiliary electrical equipment, and FIG. 2 illustrates an embodiment of the power supply itself in more detail. In FIG. 1 the triple hatching on various lines indicates that three phases are actually present although only one is shown With reference to FIGS. 1 and 2, three-phase transformer 1 has a primary side with a group of windings that receive power from conductors R, S, and T of a three-phase power distribution system. Although not explicitly illustrated, each of these windings has a plurality of taps near one end, so that the number of turns in the respective winding can be varied slightly by selecting the appropriate tap. Transformer 1 is equipped with an on-load tap changer or tap switch 11 at the primary side Tap switch 11 monitors the average output voltage of transformer 1 and automatically changes the taps that are connected to conductors R, S, and T so as to maintain a fairly constant output voltage. With tap switch 11, the optimum voltage range under load can be selected for the respective operating state of the three phase plasma heating unit 4, which is composed of three plasma torches 41. Converter units 20' are connected to the two groups of secondary windings 13 and 14 of transformer 1. Each converter is composed of a thyristor controlled converter 2 or 2' in the form of a three-phase current bridge (hereinafter called briefly a three-phase current bridge 2 or 2', respectively) and a choke 3 or 3' within the direct current circuit. Three-phase current bridges 2 and 2' and chokes 3 and 3' control the currents generated with a phase angle offset of 60° at secondary winding groups 13 and 14 of transformer 1. A control 5 at a terminal board 6, which is connected with an operator desk 7 and with an auxiliary supply 8, serves for this purpose.

The current, composed of the two 60° offset partial currents, flows once per phase through the central electrode 42 of each respective plasma torch 41 of three-phase plasma heating unit 4 and from there by way of a main plasma or power arc 15, which is shown symbolically in the drawing as an electrical arrow, until it reaches its star point 16 which is formed, for example, in a metal melting bath.

Additionally, an ignition arc current supply 9 and a high frequency starting device 10 are provided which are connected with the plasma torches 41 of the heating unit 4.

Transformer 1 includes at least two secondary winding groups 13 and 14 which are offset by 60°. Because of the superposition, this produces a stepped alternating current with steep zero crossings and without interruptions even for a current duration of 120° for the positive and negative current portions of the waveforms as disclosed in more detail e.g. in the KEM-article of May 1985 mentioned above; this meet all operational requirements for a plasma arc supply. If, under particularly extreme conditions of use, it nevertheless happens that an arc breaks off, the thyristor firing pulses for the torches 41 which conduct current are automatically switched from 120° to 180° phase angles by control 5. These torches 41 are then fed with single phase current until the torch 41 without current is moved back into firing position and can be switched back to three-phase current operation.

As a whole, the thyristor controlled converter units 20' thus contribute to stable, operationally reliable and economical operation of plasma arcs 15.

Figure 3:
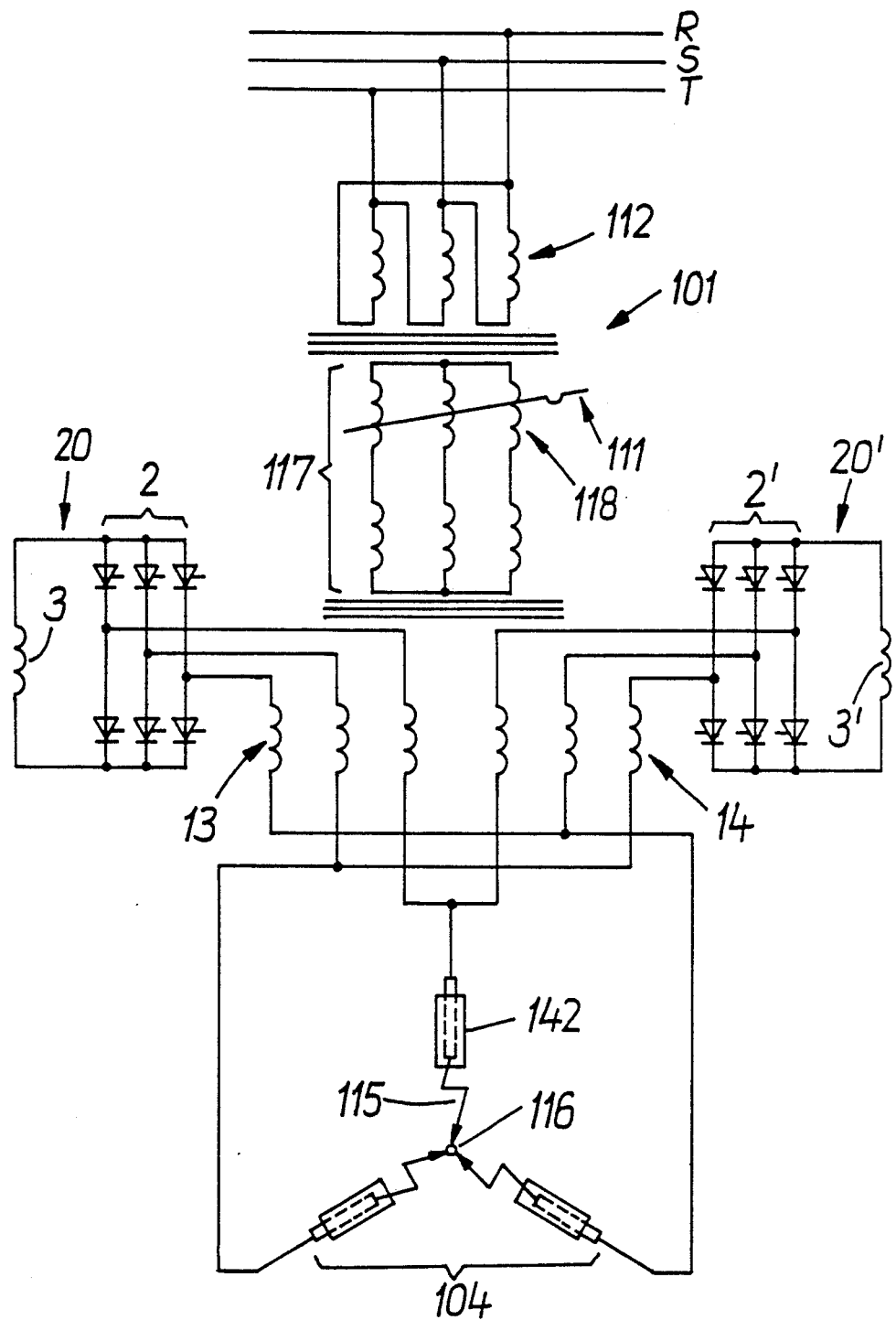
FIG. 3 is a three-phase illustration showing a modified power supply which includes a tap switch in an intermediate circuit.

In the embodiment of FIG. 3, transformer arrangement 101 is equipped with an intermediate circuit 117 between primary winding group 112 and secondary winding groups 13 and 14, with a tap switch 111 being disposed at the input winding group 118 of the intermediate circuit 117. In the illustrated embodiment, plasma torches 142 of plasma heating unit 104 are oriented radially toward one another. In this case, the star point 116 is formed within the plasma of the three converging main arcs 115.

The transformer 1 of the power supply according to FIGS. 1 and 2 may be of the type ODRW 7370/12 of Hochspannungstechnik und Transormatorbau GmbH of D-3510 Hann. Münden, Fed. Rep. of Germany, and the respective tap switch 11 may be of the type V III 500/D of Maschinenfabrik Reinhausen of D-8400 Regensburg, Fed. Rep. of Germany.

The transformer arrangement 101 of the power supply according to FIG. 3 may be of the type ORG 25 000/30+OG 12 500/30 of Starkstrom-Gerätebau GmbH of D-8400 Regensburg, Fed. Rep. of Germany, and the respective tap switch 111 may be of the type M III 300/Y of above mentioned Maschinenfabrik Reinhausen.

The present disclosure relates to the subject matter disclosed in Federal Republic of Germany application No. P 36 32 425.6, filed Sept. 24th, 1986, the entire disclosure of which is incorporated herein by reference.

It will be understood that the above description of the present invention is susceptible to various modifications, changes and adaptations, and the same are intended to be comprehended within the meaning and range of equivalents of the appended claims.

What we claim is:

1. A power supply for a three-phase plasma heating unit, comprising:
    a three-phase transformer having a primary winding group and at least two secondary winding groups which are offset by a 60° phase angle and which are connected to a three--phase plasma heating unit, the transformer additionally having taps which are switched under load; and
    a plurality of converter units each connected to a respective secondary winding group, each converter unit including a three-phase current-bridge and a choke in the direct current circuit.

2. The power supply of claim 1, wherein the taps that are switched under load are disposed at the primary winding group.

3. The power supply of claim 1, wherein the three-phase current bridge comprises a thyristors.

4. The power supply of claim 1, wherein the three-phase plasma heating un-.it comprises means for generating a plurality of arcs, wherein each three-phase current bridge comprises a plurality of thyristors, and further comprising control means for generating pulse sequences for the current bridges to selectively trigger the thyristors thereof, each pulse sequence having a phase angle, the control means including means for changing the phase angle from 120° to 180° if an arc breaks off.

5. A power supply for a three-phase plasma heating unit, comprising
- a first three-phase transformer having a primary winding group and a secondary winding group, the secondary winding group having taps which are switched under load;
- a second three-phase transformer having a primary winding group and at least two secondary winding groups which are offset by a 60° phase angle and which are connected to the three-phase plasma heating unit, the primary winding group of the second transformer being connected to the secondary winding group of the first transformer; and
- a plurality of converter units in a direct current circuit, each converter unit including a choke and a three-phase current bridge which is connected to a respective secondary winding of the second transformer.

6. The power supply of claim 5, wherein each three-phase current bridge comprises thyristors.

7. The power supply of claim 5, wherein the three-phase plasma heating unit comprises means for generating a plurality of arcs, wherein each three-phase current bridge comprises a plurality of thyristors, and further comprising control means for generating pulse sequences for the current bridges to selectively trigger the thyristors thereof, each pulse sequence having a phase angle, the control means including means for changing the phase angle from 120° to 180° if an arc breaks off.

8. A power supply having a first, second, and third power output ports for connection to a three-phase plasma heating unit, said power supply comprising:
- a three-phase transformer having a primary winding group and having two secondary winding groups, each secondary winding group having three coils with first and second ends, the first end of a coil in one of the secondary winding groups and the first end of a coil in the other of the secondary winding groups being connected to the first output port, the first end of another coil in said one of the secondary winding groups and the first end of another coil in said other of the secondary winding groups being connected to the second output port, and the first end of a further coil in said one of the secondary winding groups and the first end of a further coil in said other of the secondary winding groups being connected to the third output port;
- a converter unit connected to the second ends of the coils in said one of the secondary winding groups, the converter unit including a three-phase current bridge and a choke connected to the bridge; and
- another converter unit connected to the second ends of the coils in said other of the secondary winding groups, the another converter unit including a three-phase current bridge and a choke connected to the bridge of the another converter unit.

9. The power supply of claim 8, wherein the transformer further comprises taps in the primary group which are switched under load.

10. The power supply of claim 8, wherein the three-phase current bridge of the converter unit comprises a plurality of thyristors and wherein the three-phase current bridge of the another current unit comprises a plurality of thyristors.

11. The power supply of claim 10, further comprising means for generating pulse sequences to selectively trigger the thyristors, each pulse sequence having a phase angle, and means for selectively changing the phase angle from 120° to 180 °.

12. The power supply of claim 8, further comprising another transformer having a primary winding group and having a secondary winding group with taps which are switched under load, the primary winding group of said transformer being connected to the secondary winding group of said another transformer.

13. The power supply of claim 8, in combination with the three-phase plasma heating unit.

14. The combination of claim 13, wherein the three-phase plasma heating unit comprises a first plasma torch which is connected to the first power output port, a second plasma torch which is connected to the second power output port, and a third plasma torch which is connected to the third power output port.

* * * * *